Nov. 25, 1941.    O. C. FUNDERBURK    2,264,133
SYSTEM FOR TREATING, DISTRIBUTING, AND CONVEYING
AIR IN INTERNAL COMBUSTION ENGINES
Filed Aug. 30, 1939    10 Sheets-Sheet 1

INVENTOR
Otis C. Funderburk
BY
ATTORNEY

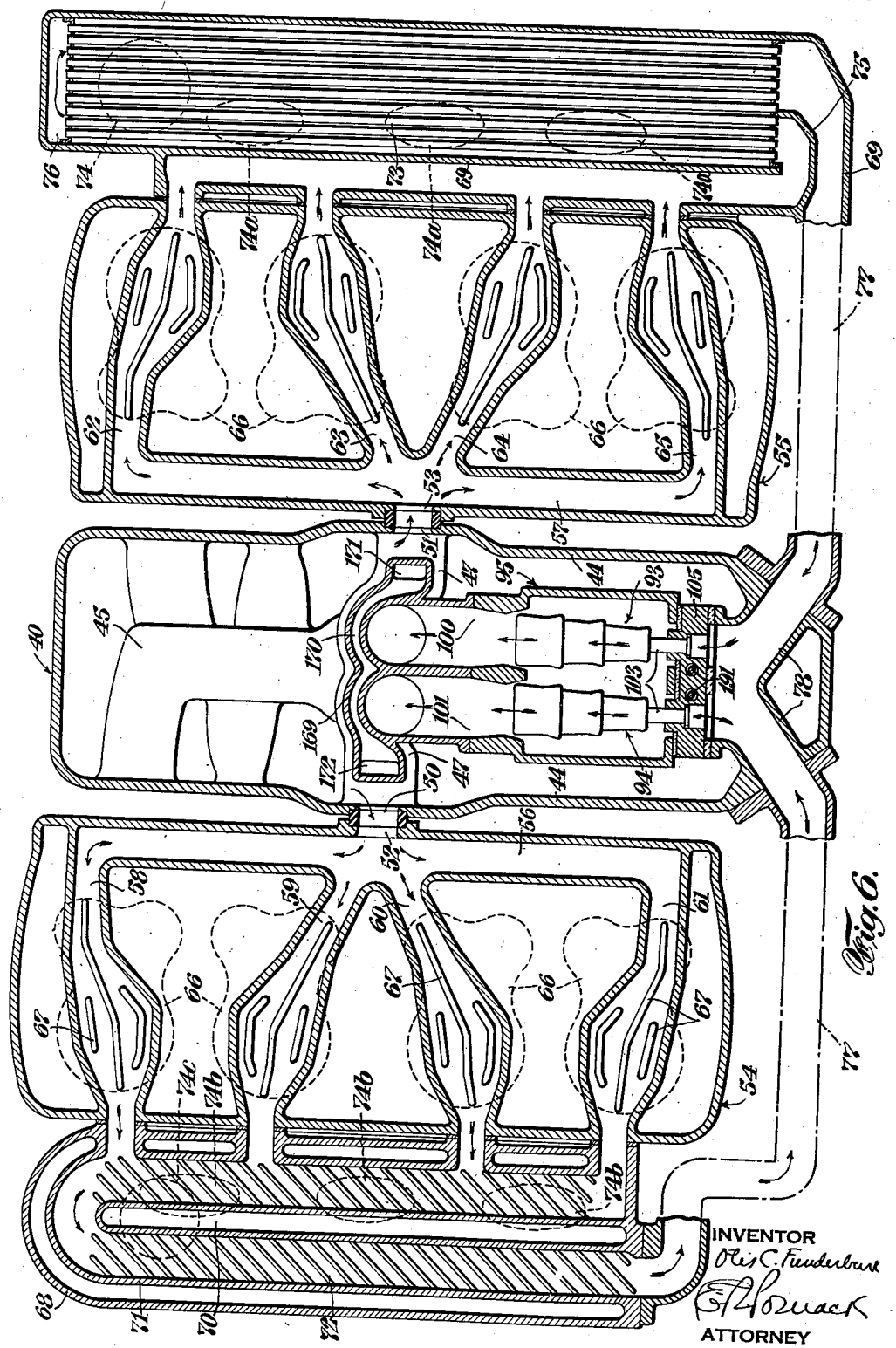

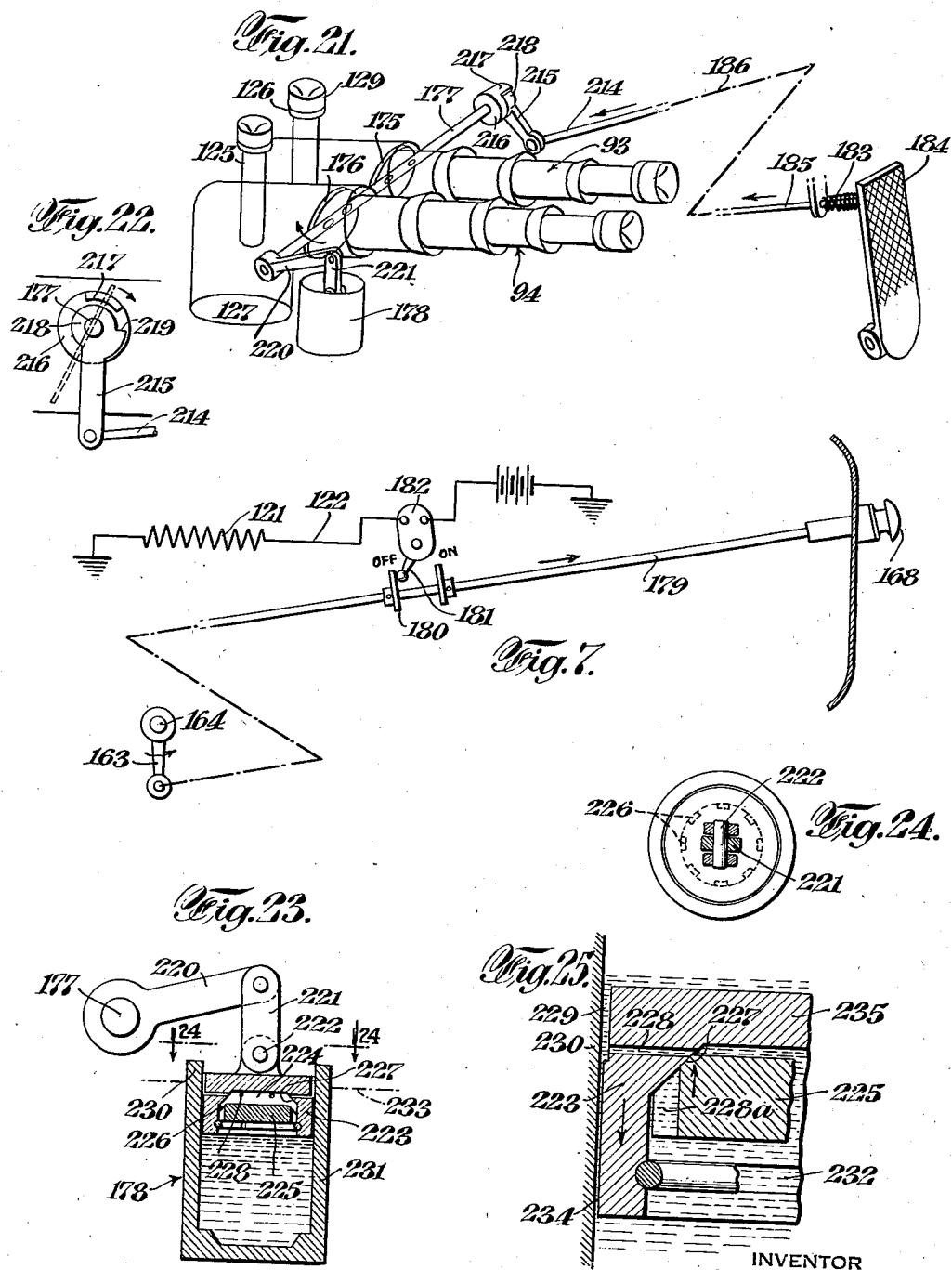

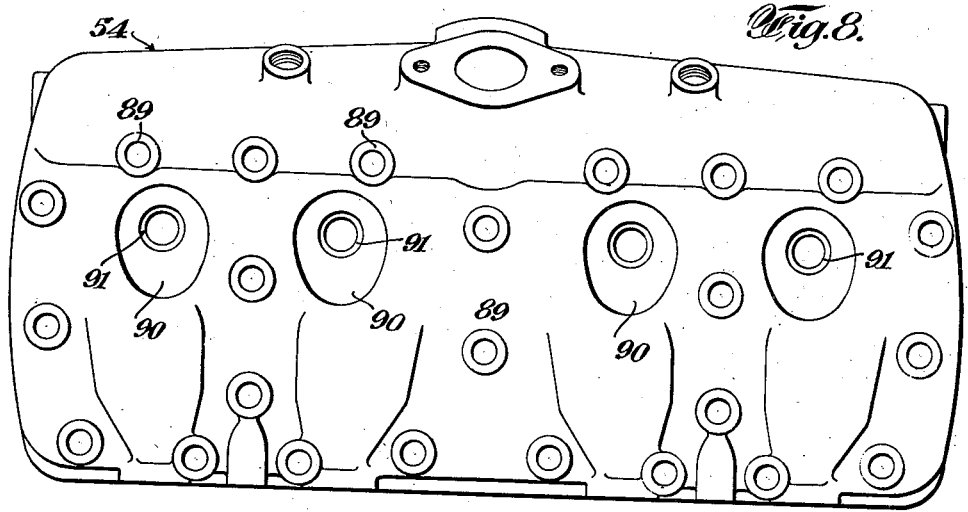
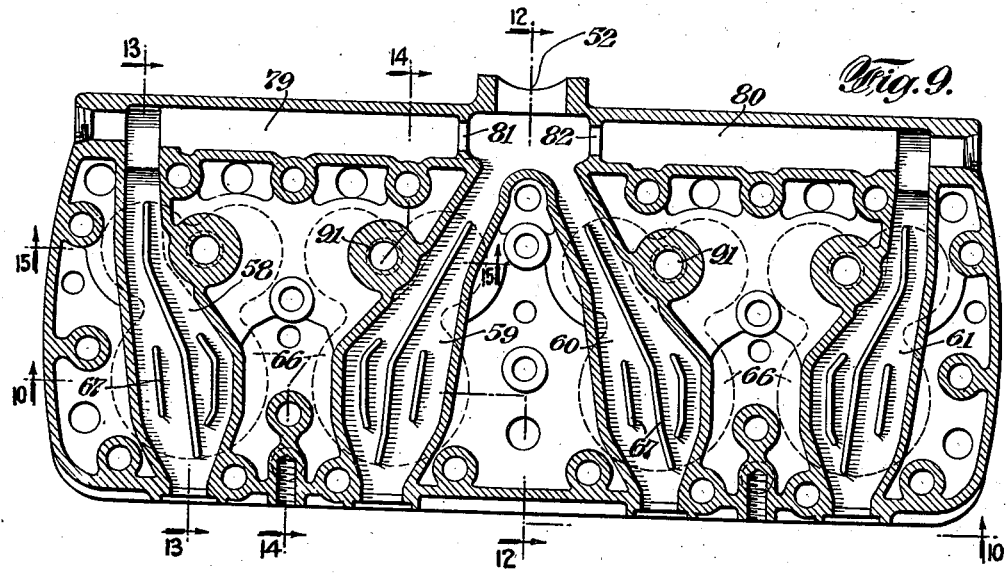
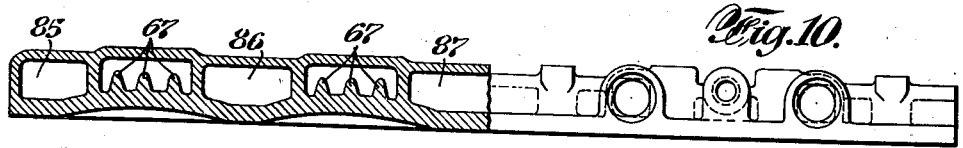
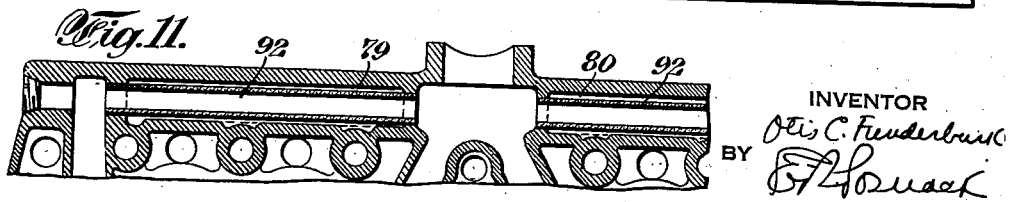

Nov. 25, 1941.  O. C. FUNDERBURK  2,264,133
SYSTEM FOR TREATING, DISTRIBUTING, AND CONVEYING
AIR IN INTERNAL COMBUSTION ENGINES
Filed Aug. 30, 1939  10 Sheets-Sheet 8
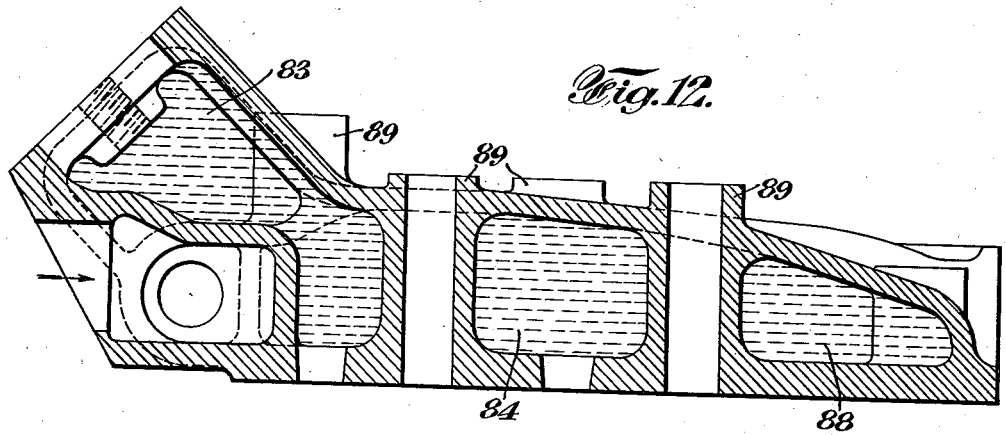
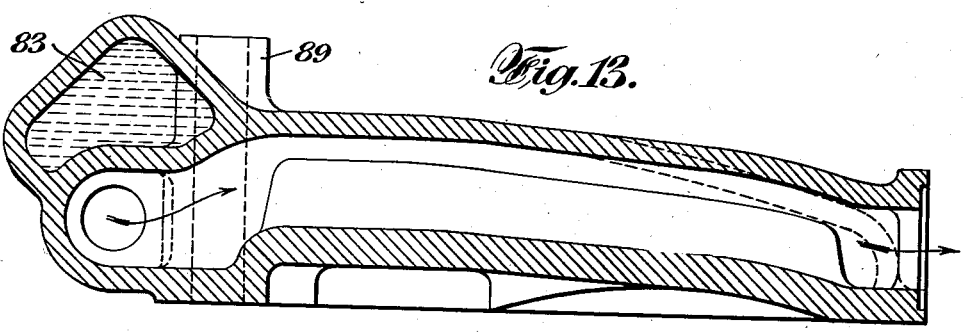
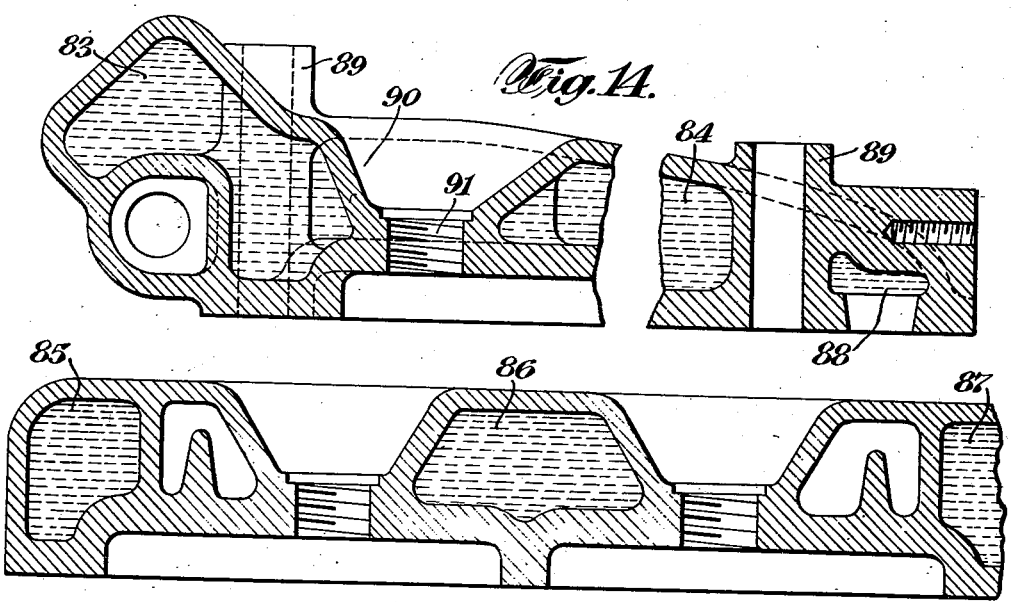
INVENTOR
Otis C. Funderburk
BY
ATTORNEY Nov. 25, 1941.  O. C. FUNDERBURK  2,264,133
SYSTEM FOR TREATING, DISTRIBUTING, AND CONVEYING
AIR IN INTERNAL COMBUSTION ENGINES
Filed Aug. 30, 1939   10 Sheets-Sheet 9
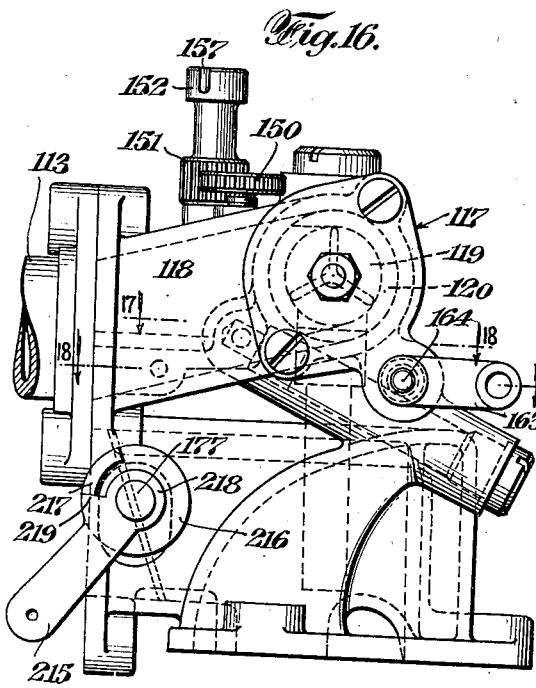
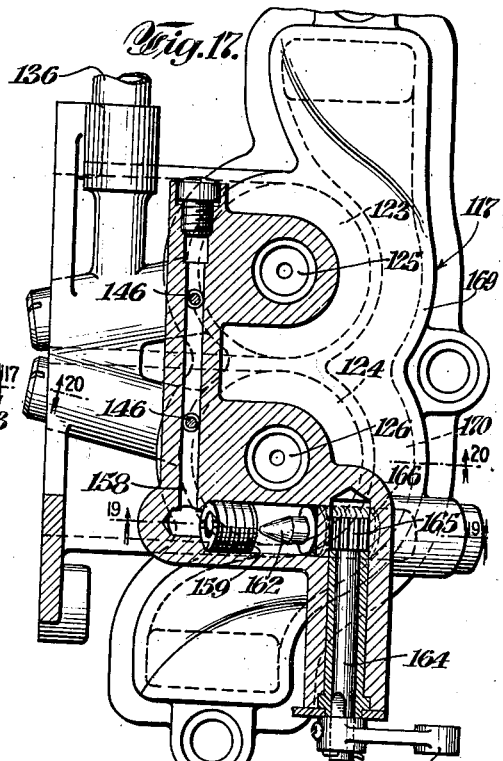
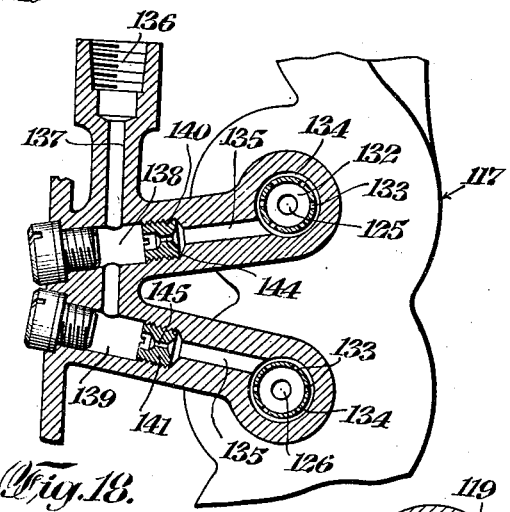
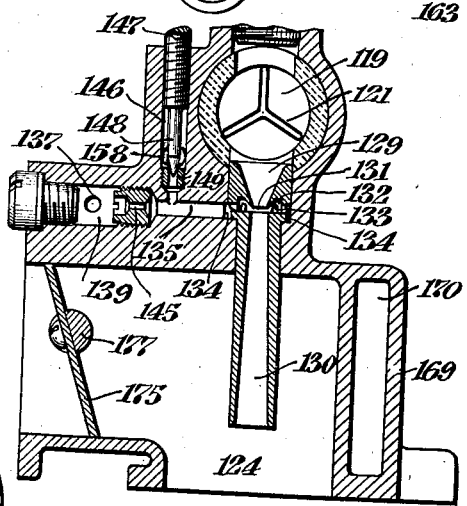
INVENTOR
Otis C. Funderburk
BY
ATTORNEY

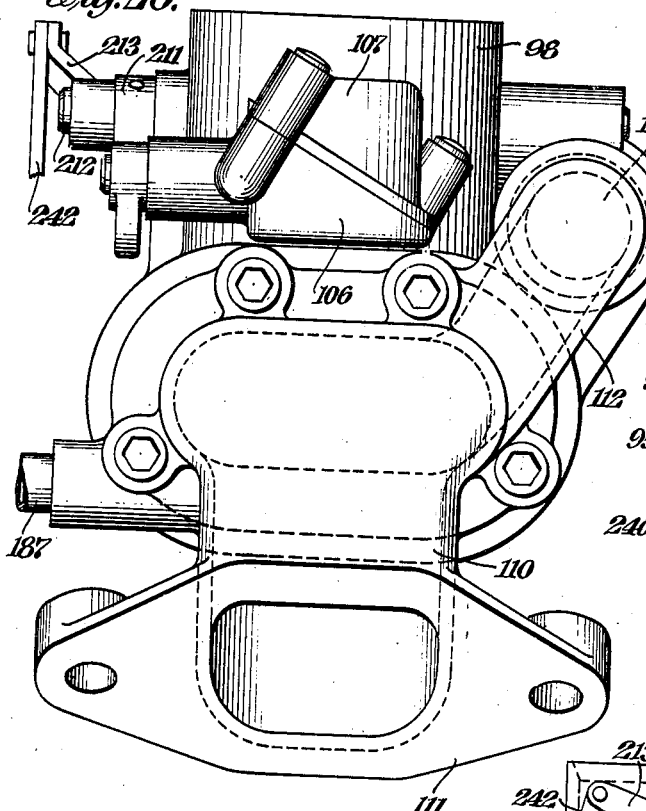
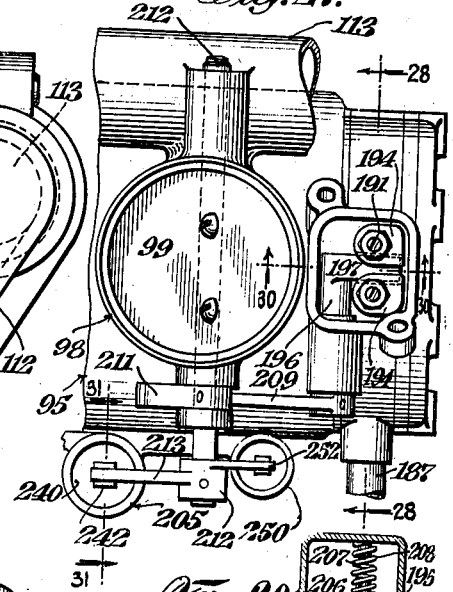
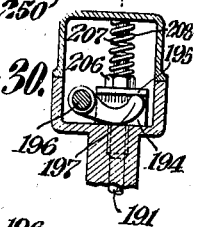
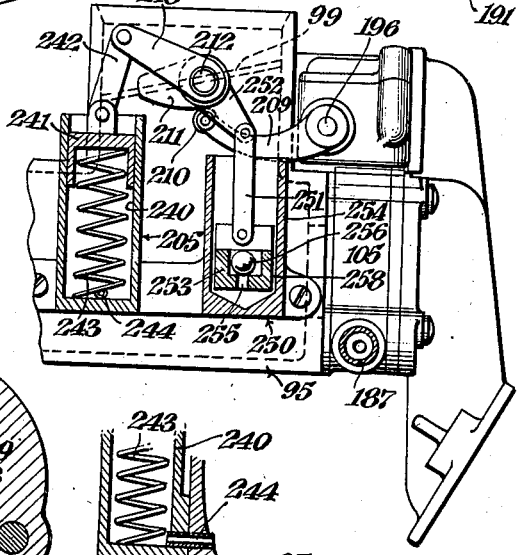
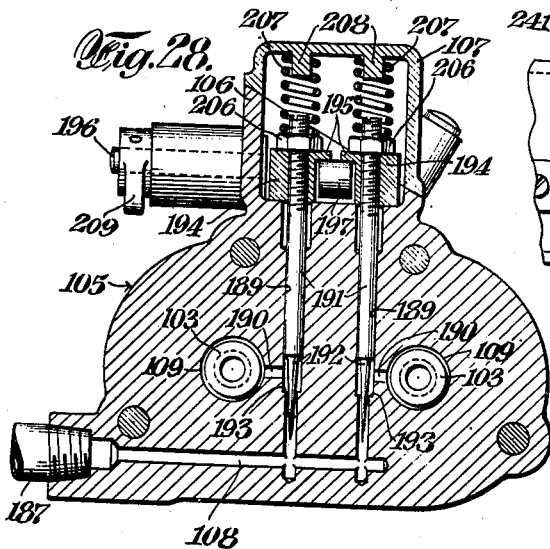

Patented Nov. 25, 1941

2,264,133

UNITED STATES PATENT OFFICE 2,264,133

SYSTEM FOR TREATING, DISTRIBUTING, AND CONVEYING AIR IN INTERNAL COMBUSTION ENGINES

Otis C. Funderburk, Weston, Mass., assignor, by mesne assignments, to Kane Carburetor Corporation of Delaware, Wilmington, Del., a corporation of Delaware Application August 30, 1939, Serial No. 292,580

8 Claims. (Cl. 123—122)

This invention relates to a method and apparatus for treating, distributing and conveying air in an internal combustion engine, and particularly for so directing and preheating the required air as to render it adaptable for heating, cooling, atomizing, emulsifying and combustion purposes.

It is within the contemplation of my invention to effectuate a quick rise in the temperature of the air supply for the carbureting and gasifying system, and to thereby reduce to a marked degree the long warming up periods necessary in common practice with conventional systems. And in this aspect of my invention it is hence also an object to effect a quick starting of the engine upon the cranking thereof, as well as to permit such prompt starting without the necessity of restricting the air flow as is the common practice with the conventional choke mechanisms employed on most carbureting systems.

This invention also has for one of its main objectives the efficient utilization of the heat in the combustion chamber as well as that in the exhaust manifold to preheat a predetermined portion of the air drawn into the engine, thereby increasing the thermal efficiency of the motor by eliminating the usual heat losses occurring in conventional engines due to the dissipation of heat to the water jacket through the combustion chambers, particularly when water temperatures are low. And it is also an object of my invention to enable relatively high compression ratios to be employed with average fuels.

It is also within the contemplation of my invention to enable a wide range of fuels, from solvents and other heavy hydrocarbons to relatively volatile fuels, to be effectively carbureted or gasified, and also to permit the ready gasification of low gravity hydrocarbon fuels for starting purposes without the employment of flame or other dangerous heating expedients.

Another object of my invention is to provide a system of so receiving, confining and distributing air directly from the atmosphere as to enable it to be thoroughly cleansed, and then directed, while still unheated and before being diverted to other paths, along the intake manifold, thereby maintaining the manifold at a substantially uniform temperature throughout the extent thereof, and keeping it relatively cool for high engine volumetric efficiencies. And it is my further purpose to attain this objective with the aid of a simple, compact and readily installed air cleaner of relatively low center of gravity, and hence not subject to the lateral vibrations and dangerous stresses prevalent in the conventional drum type of air cleaner mounted on top of the carburetor, particularly in the so-called floating power designs. And in this aspect of my invention it is a further object to provide easier passage of the air from the cooling fan than is possible with conventional air cleaner structures, an objective which is accomplished by the reduction of the obstructions in the slip stream from the fan due to the low disposition and smooth configuration of the cleaner, with a resulting enhanced efficacy of the cooling system. And it is still another object to employ the air cleaner structure to muffle the action of the gasifying system, for silent operation.

Another object of my invention is to eliminate "vapor-lock" or stratification of the gasoline vapors prevalent in conventional carbureting systems, particularly under high temperature and high altitude conditions, an objective which I attain by shielding the intake manifold from the direct action of the fan and by employing relatively cool air in circulation substantially surrounding the entire manifold for preventing such a condition. Further prevention of "vapor-lock" is obtained by floatless fuel-lift supply system which provides for the fuel leading to the gasifier to be in constant motion and hence is delivered to the metering system without being arrested in its movement from the supply tank by valves such as are used in conventional carburetor float chambers that materially add to "stratification" or "vapor-lock" in the fuel supply stream. My system has no valves in the fuel supply system from the metering pins to the supply tank, hence no chance of vapor pressures being locked in the supply system as aforementioned. Furthermore, by not having any fuel in storage in the carbureting system, heat from the engine is prevented from penetrating and saturating the said fuel supply.

Still a further object of this invention is to provide a controlled emulsified fuel charge for starting, warming up, idling and part throttle purposes, and to thereby accomplish several additional objectives, including a simple control for varying the richness of the fuel charge without cutting or restricting the primary air supply and preventing freezing of parts in the carbureting system such as occurs frequently in internal combustion motors, particularly aeronautical engines.

It is also within the contemplation of my invention to so direct and treat the air flowing through the system as to enable fuel to be lifted, in controlled manner, directly from the gas tank without the use of a carburetor float bowl or similar reservoir.

Other objects, features and advantages will appear from the drawings and the description hereinafter given.

Referring to the drawings,

Figure 6 is a semi-diagrammatic development of the engine illustrated, showing the intake manifold with the gasifying system thereover, the cylinder heads, and the exhaust preheating system, and illustrating the flow of heat-emitting and heat-transmitting fluids therethrough.

Figure 7 is a schematic representation of the mixture control button on the instrument panel and its connection with the battery circuit and the emulsifying air lever.

Figure 8 is a plan view of a cylinder head of the structure illustrated and which is positioned over one bank of four cylinders.

Figure 9 is a transverse section of the cylinder head taken substantially along line 9—9 of Figure 1.

Figure 10 is a part elevation, part section of Figure 9 along line 10—10.

Figure 11 is a fragmentary transverse section of a slightly modified form of cylinder head, the section being taken substantially along line 9—9 of Figure 1,—similar to that of Figure 9.

Figure 12 is a section of Figure 9 taken along line 12—12.

Figure 13 is a section of Figure 9 taken along line 13—13.

Figure 14 is a fragmentary section of Figure 9 taken along line 14—14.

Figure 15 is a fragmentary section of Figure 9 taken along line 15—15.

Figure 16 is a side elevation of the primary venturi and anterior throttle valve casing positioned upon the intake manifold, the view being taken substantially along line 16—16 of Figure 5.

Figure 17 is a sectional plan view of Figure 16 taken along line 17—17.

Figure 18 is a fragmentary sectional plan of Figure 16 taken along line 18—18.

Figure 19 is a fragmentary section of Figure 17 taken along line 19—19.

Figure 20 is a fragmentary section of Figure 17 taken substantially along line 20—20.

Figure 21 is a schematic perspective view of the anterior throttle system shown operatively associated with the main multiple-Venturi assembly, the throttle fluid dash pot, the accelerator pedal, and connecting control linkage.

Figure 22 is a fragmentary side view of the throttle valve lever assembly of Figure 21.

Figure 23 is a vertical sectional view of the fluid dash pot construction of Figure 21.

Figure 24 is a sectional plan view of Figure 23 taken along line 24—24.

Figure 25 is an enlarged fragmentary vertical section of the device of Figure 24.

Figure 26 is a rear view of the assembly of preheated air inlet and main metering inlet block.

Figure 27 is a fragmentary plan view of Figure 26.

Figure 28 is a section of Figure 27 taken substantially along line 28—28.

Figure 29 is a fragmentary side view of Figure 27.

Figure 30 is a section of Figure 27 taken substantially along line 30—30, and

Figure 31 is a fragmentary vertical section of Figure 27 taken along line 31—31.

Figure 1:
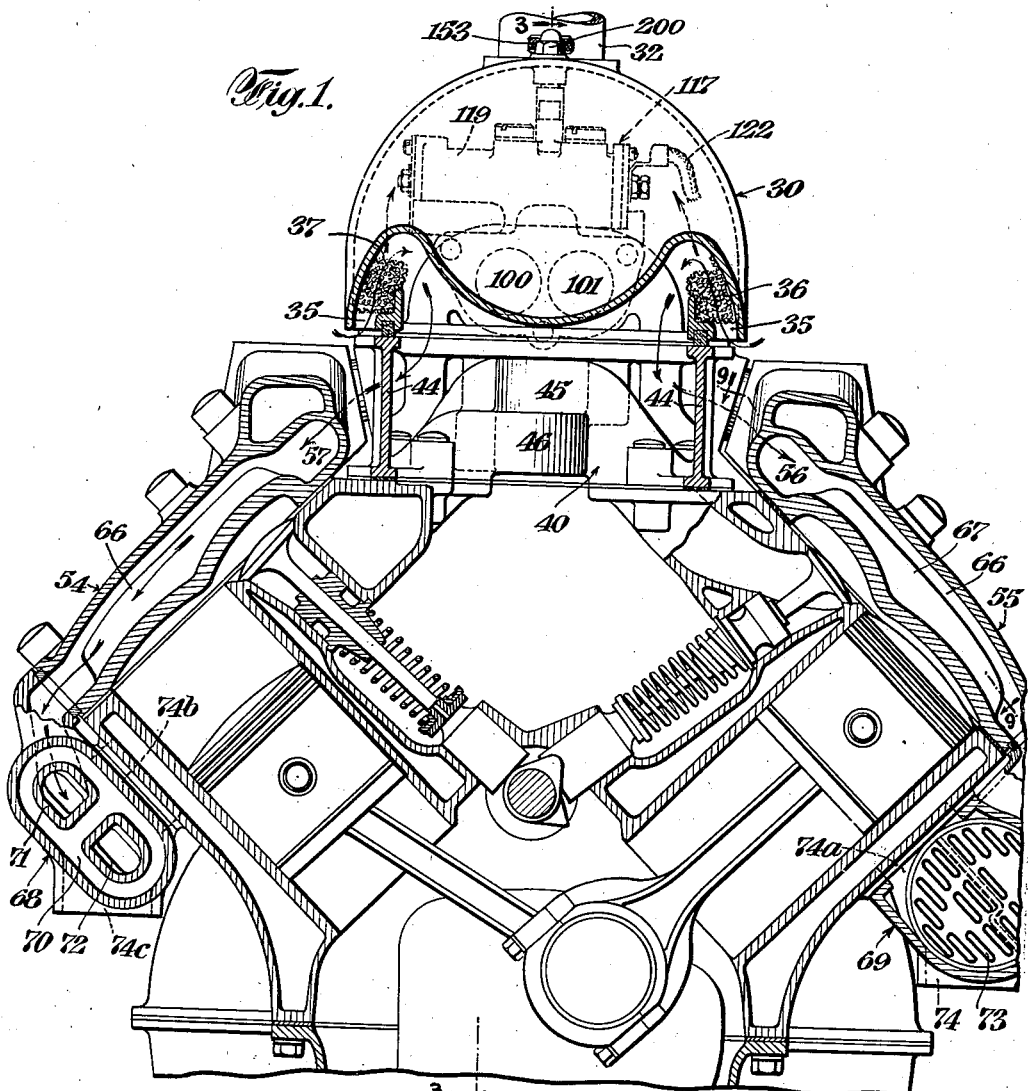
Figure 1 is a fragmentary, transverse, vertical section of a V type internal combustion engine containing my invention, the specific design illustrated being a Ford V-8 engine—the section being taken through the cylinder nearest the radiator on the right bank, looking rearwardly towards the air cleaner and the dash.
Figure 2:
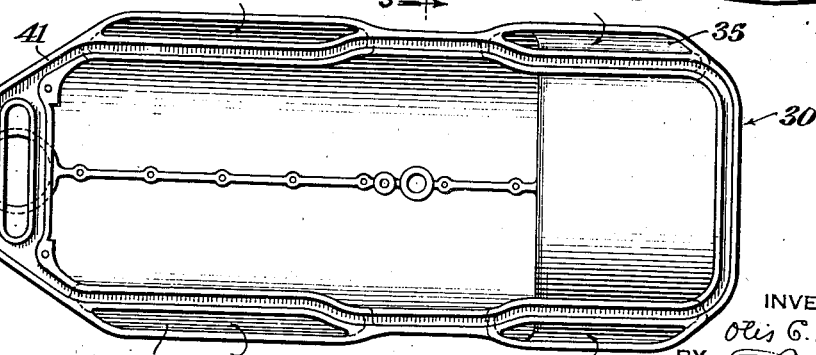
Figure 2 is a bottom view of the air cleaner casing of Figure 1.

The system constituting my invention contemplates the introduction into an internal combustion engine of atmospheric air through an air cleaner casing and intake manifold assembly of special construction, whereby the air drawn in will be confined along predetermined paths to enable it to perform its various intended functions during its passage to the cylinders. After the air is cleansed by the metallic foil in the air cleaner, as will be more specifically hereinafter set forth, a substantial portion of it is first distributed throughout the entire intake manifold before being directed to other points, the air being confined within a reservoir formed by the peripheral walls of the manifold cooperating with the walls of the air cleanser. A portion of the air in the reservoir is directed into a multiple-Venturi gasifier, substantially in accordance with the structure described in U. S. Patent No. 2,102,800 granted December 21, 1937,—to be admixed with previously vaporized fuel, forming a gaseous combustible fluid which is directed by suitable conduits to the intake valves of the engine. Another portion of the air circulating within the intake manifold casing is directed through suitable channels to special forms of cylinder heads provided with water jackets and air passageways. The aforesaid air is conveyed through these air passageways to absorb some of the heat from the combustion chambers of the cylinders therebelow, thereby becoming partially preheated. The air temperature is further increased by conducting this preheated air through heat transfer apparatus associated with the exhaust manifolds of the engine. This highly heated air is then conveyed back to the intake manifold casing where it is diverted into two paths, one being through the multiple-tube Venturi system above referred to for combining with the liquid fuel drawn up through a suitable fuel line, and the other path being through a conduit leading to the primary starting system. This last mentioned stream of air is adapted, under certain conditions, to be further heated by an electric heating element; thereafter the air is directed downwardly through the primary Venturi system to lift the fuel from an auxiliary fuel line and admix therewith,—the highly gasified mixture being then drawn directly into the intake manifold conduits and into the intake valves. Provision is also made for the controlled introduction of a portion of the preheated air into a passageway for combining with the liquid fuel coming from the said auxiliary fuel line, to form an emulsion of hot air and the liquid fuel which is ultimately led into the said primary Venturi system,—with advantages to be hereinafter set forth.

Having above described the operation of the system constituting my invention in general terms, I will now describe more specifically the apparatus of my invention for enabling the steps above referred to to be effectuated.

In the drawings, and referring particularly to Figures 1 to 4 inclusive, the air cleaner casing 30 is substantially of rectangular cross section with the roof and corners thereof of arcuate and curved configuration. This air cleaner is of relatively low height, being shown lower than the electric generator 31 disposed forwardly thereof, thereby constituting considerably less obstruction to the passage of the air from the radiator fan than is possible with the conventional drum type of air cleaner,—the smooth and curved contour of the air cleaner enhancing this effect. The air cleaner casing is held in place by bolt means 200 extending through the top thereof and operatively connected with the unit 117 to be hereinafter described. At the rear of the air cleaner is the breather pipe 32 and the passageway 33 for admitting lubricating oil through aperture 34 into the crank-case of the engine. The air cleaner 30 is further provided with rearwardly opening louvres 35 for receiving the air from the atmosphere, this air passing through metallic foil 36 held in place by the wire screening 37,— the entire air cleaner casing resting upon a circumferential gasket 38 surmounted upon the upper peripheral wall 39 of the intake manifold casing 40. In the preferred construction, the lower peripheral terminal edge 41 of the air cleaner casing is of channel-like structure to properly accommodate the said gasket 38. The inner wall of the air cleaner casing 30 is also provided with layers of heat-insulating and sound-absorbing material 42, said layers being secured in place by the fastening elements 43,—this material serving to render the operation of the carbureting system silent as well as thermally protected.

The intake manifold casing 40 contains a lateral wall 44 completely surrounding the interior of the manifold to provide an air reservoir, so that all the air drawn in through the louvres 35 of the air cleaner will be kept confined within the walls of the cleaner casing 30 and the walls 44 of the intake manifold, to be subsequently diverted to other paths in the manner hereinafter set forth. Cast integral with the casing of the intake manifold are two conduits leading to the intake valves of the engine, the upper conduit 45 leading to the two center cylinders on the right bank and the two end cylinders on the left bank and the lower conduit 46 leading to the two center cylinders on the left bank and to the two end cylinders on the right bank. Extending transversely across substantially the central portion of the intake manifold casing 40 and joining the upper portions of the longitudinal lateral walls 44 thereof is the connecting wall or flange 47 (see Figures 3, 5 and 6) containing two ports 48 and 49 (see Figure 4) communicating with the upper and lower intake manifold conduits 45 and 46 respectively. As will be hereinafter set forth, the two ports are adapted to receive the gasified fuel stream both from the multiple-Venturi system and the primary Venturi system above referred to, whereby such streams will pass directly to the intake valves of the engine.

The opposite longitudinally extending lateral walls 44 of the intake manifold casing 40 contain, preferably below the said flange 47, air outlets 50 and 51 (see Figures 4 and 6), which communicate with the inlets 52 and 53 of the cylinder heads 54 and 55 respectively. These inlets communicate with longitudinal passages 56 and 57 respectively (Figure 6), the former communicating with the transverse air passageways 58, 59, 60, and 61 and the latter with corresponding air passageways 62, 63, 64 and 65,—these passageways all being disposed directly above the combustion chambers represented by the general reference numeral 66. Each one of the air passageways contains fins or ribs generally designated as 67, and clearly shown particularly in Figure 9. The intermediate portions of these air passageways are of enlarged proportions, providing zones of low velocity and relatively large heat-transmitting surfaces, for increased heat-absorbing efficiency. The outlets of the air passageways of cylinder head 54 operatively communicate with the heat exchange unit 68, and the corresponding outlets of the air passageways of cylinder head 55 communicate with the heat exchange unit 69. Both of these heat exchange units conduct therethrough the exhaust gases from the cylinders, the heat thereof being conducted through intervening heat transmitting walls to the air currents from the cylinder heads as aforesaid.

The particular forms of units disclosed represent merely two of various other possible devices to serve this purpose, it being understood that this invention is not limited to the two forms shown in the drawings. The heat unit 68 receives from the exhaust manifold associated therewith through openings 74b the burnt gases which flow through the spaces 70 between the outer casing of the unit 68 and the inner casing 71 carrying the heat-receiving air, and out through opening 74c. The path of the air is illustrated by arrows, the air passing through the tubular casing 71 constructed with a return bend and having therein a plurality of ribs or radiating fins 72. At the opposite end is the heat exchange unit 69, as aforesaid, the form illustrated containing a plurality of tubes 73 conducting therein the hot exhaust gases entering the unit from the adjacent exhaust manifold through the openings 74a and leaving through opening 74. The exhaust outlets 74 and 74c are connected to suitable piping leading to the muffler, the specific arrangement not being illustrated as it is well-known in the art. The air from the transverse passageways of cylinder head 55 follows the course indicated by the arrows of Figure 6, entering the tubes on one side of the baffle 75, emerging into the compartment 76 and then pursuing a return course through the remaining tubes as indicated. The air streams from both preheating units are then directed by suitable pipes 77 towards the intake manifold casing, both streams of air being Siamesed through the Y portion 78 shown as an integral portion of the intake manifold casing.

It should be noted that the cylinder heads 54 and 55 are constructed to permit the operative passage therethrough not only of air, but also of water. Referring to Figures 9 and 10, the air from inlet 52 is divided into several parts, the ducts 79 and 80 being adapted to receive through the openings 81 and 82, respectively, certain portions of this air to convey such portions to the passageways 58 and 61 respectively, the remainder of the air from inlet 52 flowing directly into the passageways 59 and 60. And by referring to Figures 10, 12, 13, 14 and 15, it will be observed that passageways for water are also provided, these being designated by the reference numerals 83, 84, 85, 86, 87 and 88. Only fragmentary portions of the water jackets, however, are disposed over the combustion chambers, these high temperature regions being reserved primarily for the air passageways, for reducing the warming up period, increasing the thermal efficiency, and for the other reasons herein set forth.

And again referring particularly to Figures 8 and 9, it will be observed that the bosses generally designated by the reference numeral 89 are adapted to receive therethrough suitable studs for attaching the cylinder heads to the engine block. The depressed portions 90 contain threaded apertures 91 therein for receiving the spark plugs.

The modification of Figure 11 may at this time be referred to as merely representing a slight departure from the structure of Figure 9. Here to tubular elements 92 of insulating material are inserted in the ducts 79 and 80, to prevent a cooling of the air before entering the transverse passageways in the cylinder head. In all other respects this form of my invention is similar to that of Figure 9.

Referring again to the path of the air after leaving the heat exchange units 54 and 55 and entering the intake manifold casing 40, a portion of this air is directed into the multiple-Venturi gasifying system above referred to, and another portion is by-passed towards the primary Venturi system for supplying a combustible mixture to the engine for starting, partial throttle and idling purposes. In order to enable the action and effect of the air from this point on to be fully understood, it will be necessary to describe the arrangement of the said Venturi systems.

In the particular form of my invention as illustrated, a dual set of multiple venturis is employed whereby each set operatively feeds two cylinders on one bank and two cylinders on the other bank of the engine,—this arrangement constituting the main mixing chamber. It is understood, however, that the cylinders may be fed in any other sequence of suction on either bank, within the scope of this invention. A detailed operation of the two Venturi conduits 93 and 94 will not be attempted here, inasmuch as its operation is fully set forth and described in said Patent No. 2,102,800. Suffice it to say that each set consists of a plurality of successively expanding overlapping Venturi tubes, the overlapped terminals of each tube being disposed within a predetermined portion of the throat of the overlapping tube, certain of the terminals being serrated. The overlapping arrangement is such as to provide circumferential gaps between adjacent venturis to permit the introduction of air for interpenetration and thorough admixture with the atomized fuel streams within the conduits. Both sets of venturis are suitably mounted within a housing 95, being supported by pedestals 96 secured by screw means 97 to the base of the housing. The upper portion of the housing 95 contains an inlet duct 98 for supplying air to the circumferential gaps of said multiple-venturis, said duct having therein a rotatably mounted valve 99,—this valve being preferably mounted off-center and normally kept closed by yieldable means to be hereinafter described, and being hence adapted to be opened only under the influence of the engine suction; and the outlet end of the housing is provided with two outlet ports 100 and 101.

Figure 3:
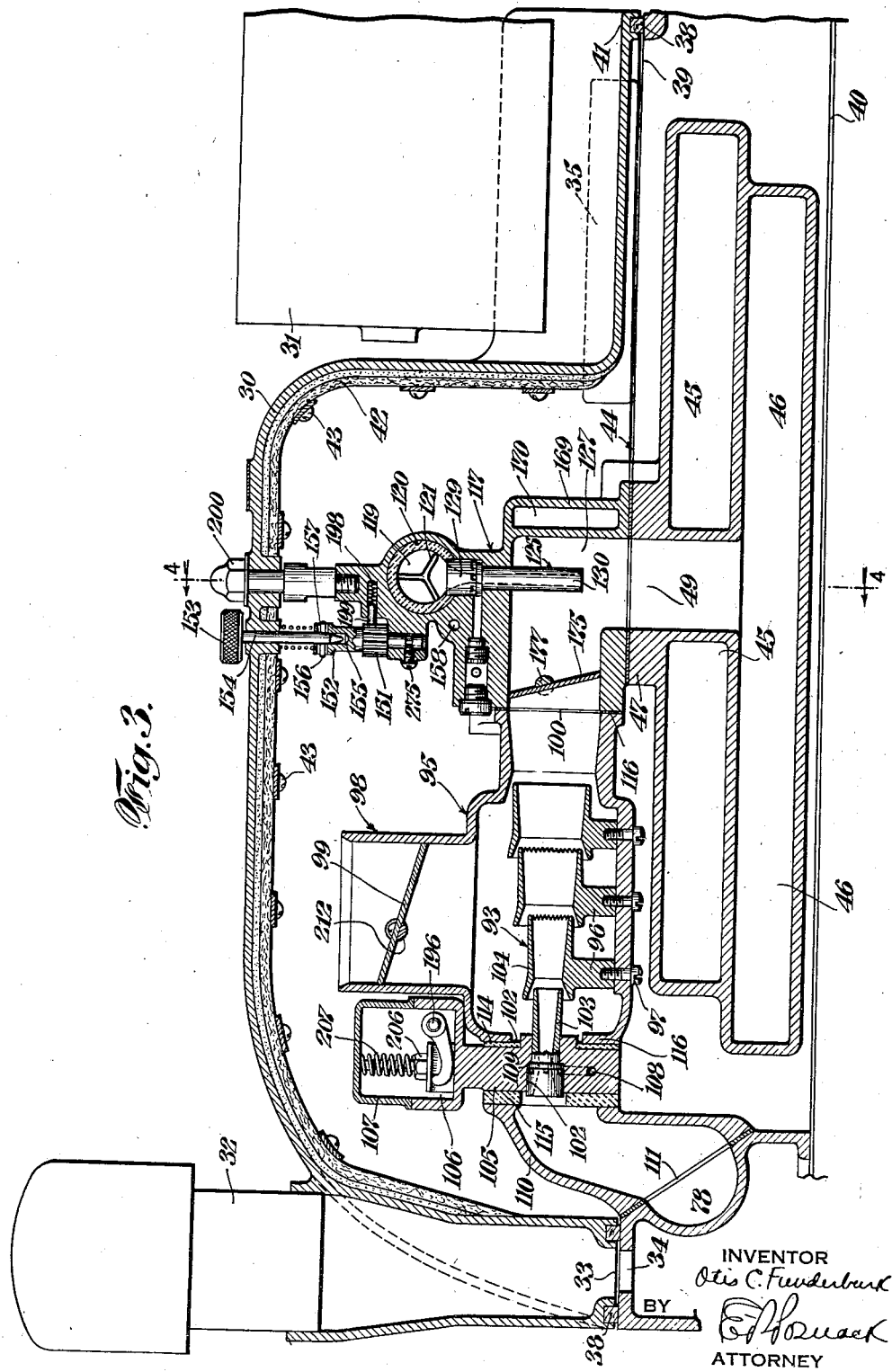
Figure 3 is a fragmentary vertical longitudinal section taken substantially along line 3—3 of Figure 1, this view showing one section of the multiple-Venturi gasifying system employed in my invention, and a portion of the primary Venturi starting system.
Figure 4:
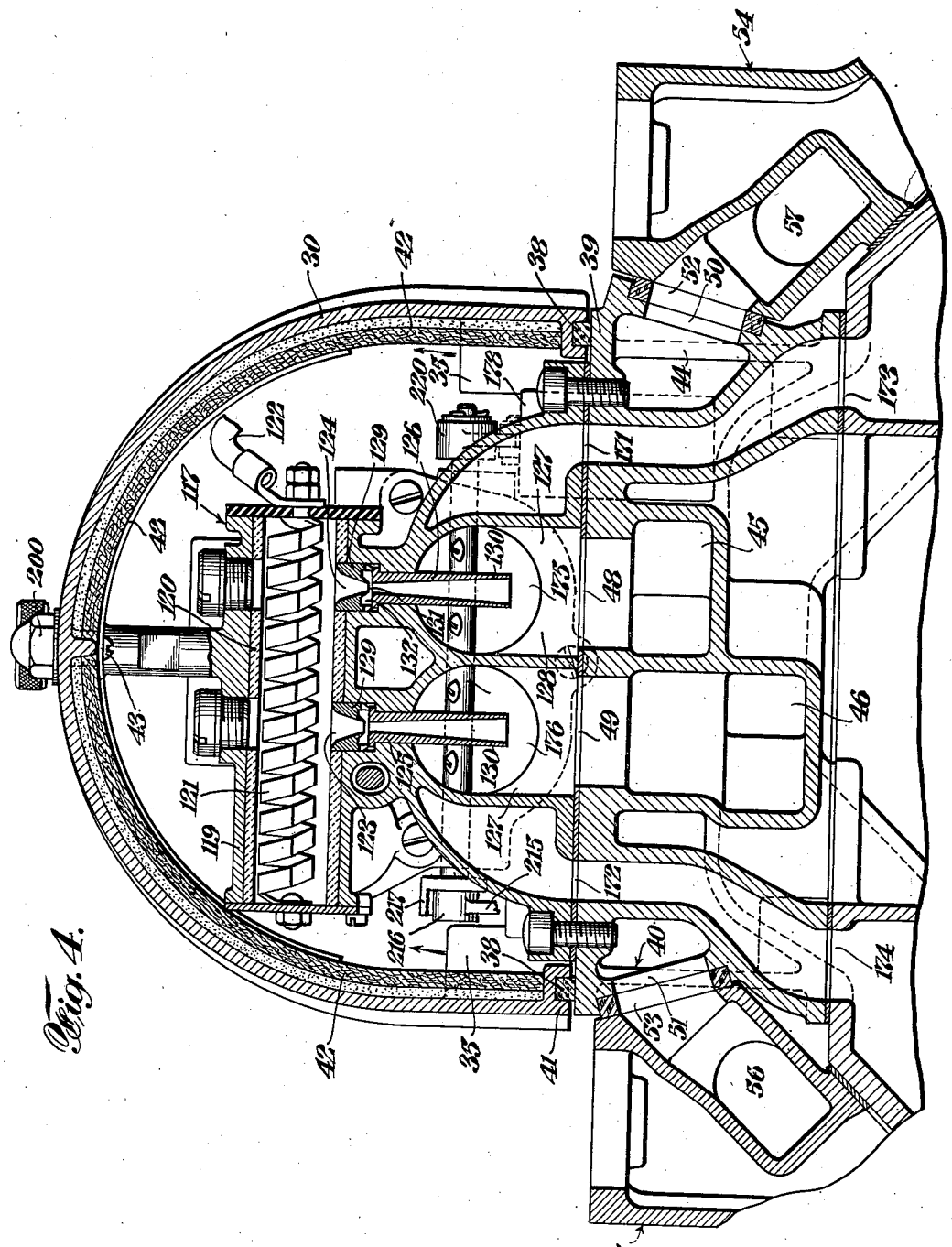
Figure 4 is a fragmentary transverse vertical section of Figure 3 taken substantially along 4—4.

Extending through the opening 102 at the rear of the housing 95 are the main Venturi fuel nozzles 103, to be more fully hereinafter described,—the terminal portion of each of these nozzles extending into the corresponding first Venturi tube 104 (Figure 3). The nozzles 103 are suitably supported within the block 105 which contains thereon a chamber 106 housing certain metering apparatus for controlling the flow of the liquid fuel into the nozzles 103, as will be more fully hereinafter set forth. The chamber 106 is also provided with a protecting cap 107 as illustrated. Said block 105 contains therein the pasageway 108 for the liquid fuel from main fuel line 187 (see Figures 3, 28), the liquid fuel being conducted, as will hereinafter appear, to the annular chamber 109 in each Venturi nozzle 103, from which it is drawn into the region of the throat of the nozzle by the depression prevalent therein due to engine suction. The details of the nozzles 103 are similar to primary nozzles 125 and 126, and these together with the specific metering arrangement will be later referred to and described in greater detail for clarifying the operation of this device.

Attached to the rear of block 105 is the fitting 110 (Figures 3, 5 and 26) which at the lower flanged terminal 111 thereof communicates with the aforesaid Y portions 78 of the intake manifold casing to permit the entrance of the air from the aforesaid exhaust preheater units. The said fitting also contains a second outlet 112 which communicates with a tubular by-pass forming part of the housing unit 95 and extending longitudinally therealong, as clearly shown in Figure 5. It will be noted that the said block 105 is separated from the casing 95 and the fitting 110 by gaskets 114 and 115.

Figure 5:
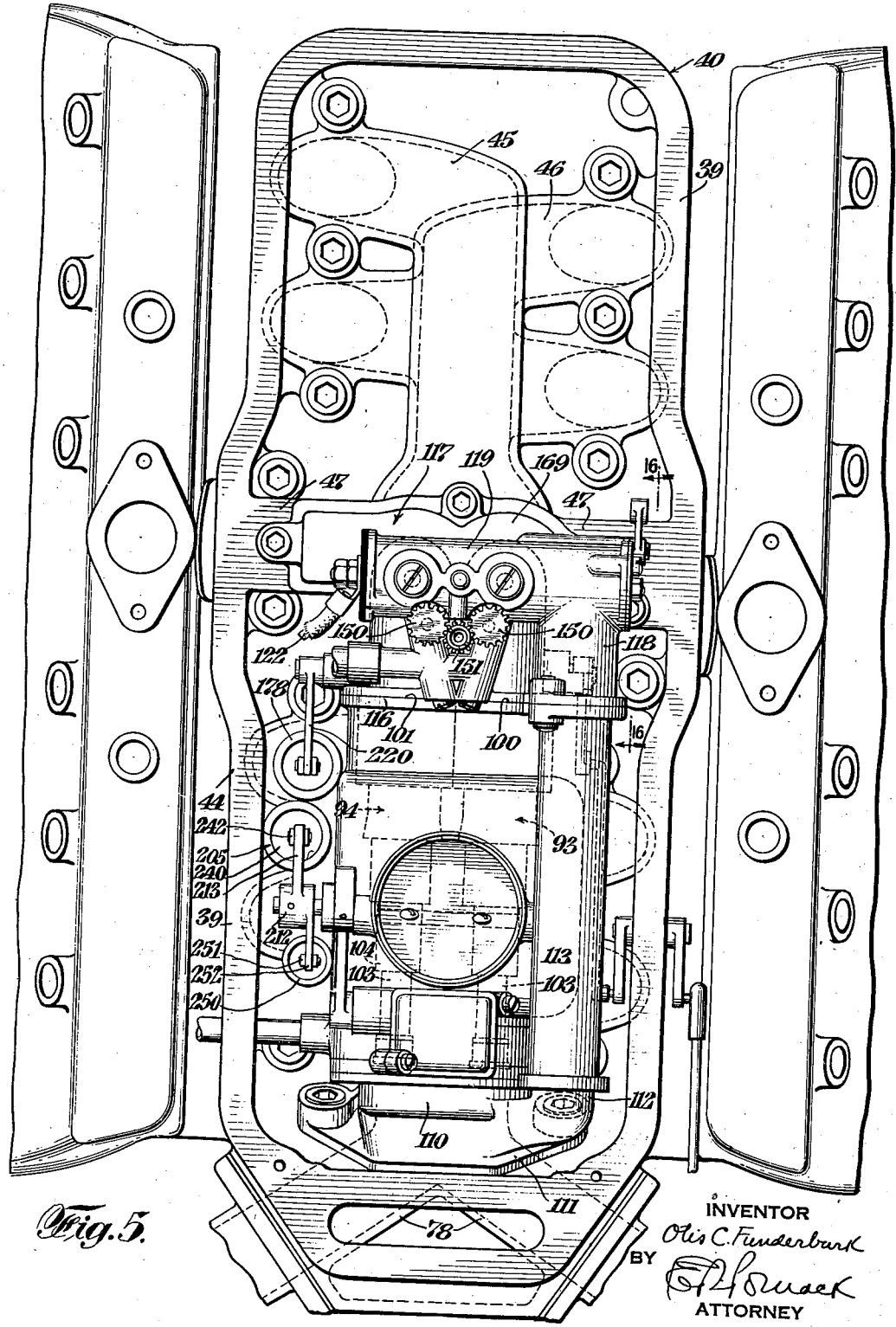
Figure 5 is a partial plan view of the engine illustrated in Figures 1 and 3 with the air cleaner casing removed.

The conduit housing 95 terminates at the forward end thereof in a flange 116 the entire face thereof being preferably in one plane, as shown in Figure 5. Bolted on to this flange and suitably supported upon the horizontal wall 47 of the intake manifold casing is the primary mixing chamber and throttle valve unit 117, shown in Figures 3 and 16 to 20. This unit serves numerous purposes, including the support of suitably controlled unbalanced throttle valves within passages for admitting into the intake manifold conduits 45 and 46 the gasified fuel stream from the aforesaid main multiple-Venturi system; the creation of a sufficient depression, under the direct influence of the intake manifold suction, to introduce into the engine a gasified combustible mixture at the instant of starting; to preheat for starting purposes sufficient quantities of previously heated air to insure combustion; to provide for quick heating of the said primary mixture chamber by the direct action of the exhaust gases passing through a heat bridge; and to enable a manual control of the richness of the starting mixture to be readily effectuated without restricting the supply of air.

The by-pass 113 communicates directly with the duct 118 in the unit 117, this duct joining and communicating with the transversely disposed air channel 119 in said unit, such juncture being shown in Figure 5. The inner wall of channel 119 is lined with suitable insulating material 120 and contains therein the electric heating element 121, which is connected by suitable conducting means, including the wire 122 (Figure 4), to the battery and starting mixture control button 168,—the circuit being shown in Figure 7 and hereinafter described. The auxiliary air channel 119 contains in the lower wall thereof two openings 123 and 124 from which extend the two auxiliary venturis 125 and 126, these being disposed within the ducts 127 and 128 respectively, the ducts being in registry with the openings 49 and 48 and hence in communication with the intake passageways 45 and 46 of the intake manifold.

Each of the auxiliary venturis 125 and 126 is substantially similar to the Venturi construction of nozzle 103, and comprises an inlet portion 129 and an outlet portion 130, both of said portions being of conical configuration with the apical portions in proximate but spaced relation thereby providing in the region of the throat thereof a gap 131. Surrounding this throat region is an annular chamber 132 containing a plurality of apertures 133 which communicate with another annular chamber 134 into which the fuel inlet duct 135 extends. Hence fuel operatively introduced into the annular chamber 134 will be drawn through the apertures 133 into the annular chamber 132, and thence through the gap 131 at the throat of the venturi downwardly towards the intake manifold. The preheated air entering the inlets 123 and 124 creates a considerable depression in the throat of each of these venturis,—the depression being sufficient to draw in the auxiliary fuel from the fuel line 136 leading directly to the fuel tank. Due to the highly preheated state of the air entering the auxiliary venturis 125 and 126, a very thorough vaporization of the liquid fuel is effected, thereby insuring ignition in the cylinders. And to assure starting without flooding the manifold under the comparatively unfavorable conditions of a cold engine, and to provide for smooth idling operation, my invention further controls the flow of the air and gases as will hereinafter be explained.

For the purpose of initial starting, liquid fuel for the unit 117 is conveyed through the auxiliary fuel line 136 to the inlet channel 137 which intersects the chambers 138 and 139, the latter communicating with the two primary venturis 125 and 126 through the jets 140 and 141 and the two channels both identified by the reference numeral 135. The said jets 140 and 141 are threaded within their respective chambers 138 and 139, and are replaceable so as to present restricted passageways 144 and 145 of such dimensions as may be suitable under the circumstances. The channels 135 are preferably in tangential relation with respect to the annular chambers 134 surrounding the throats of the nozzle so as to facilitate the entrance of the fuel therein.

Extending within and in threaded engagement with the walls of the two "emulsion" air ducts 146 within the body of unit 117 are the threaded stems 147, each of these carrying a needle valve pin 148 operatively engageable with a valve seat 149 communicating with a channel 135. The threaded stems 147 extend upwardly through the body of unit 117 and have attached to their upper terminals the two gears 150 which flank and engage the gear 151. Said latter gear is fixedly attached to the coupling 152 mounted thereover, said coupling and associated gears being rotatable to raise and lower the valve pins 148, through the medium of a knurled knob 153 (see Figure 3), mounted on a shaft 154 extending through the air cleaner casing 30. Said shaft extends downwardly into the axial aperture 155 in the said head 152 and is maintained in fixed relation thereto by the pin 156 extending through the slot 157 in said head. Yieldably urged outwardly by spring 198 from the body of the unit 117 is the lock pawl 199 in engagement with the teeth of gear 151 to retain it in its projected position, and also to enable the extent of rotary movement of knob 153 to be determined, in well-known and conventional manner.

Both of said air ducts 146 are connected to the transverse air-bleed channel 158 (Figure 17), which communicate with the valve member 159 (Figure 19) positioned within the air duct 160. Communicating between air duct 160 and the auxiliary air channel 119 is the passageway 161; and positioned within the duct 160 is the needle valve pin 162 normally kept in its open position with respect to valve seat at 159 by the normal position of the mixture control button 168 to be hereinafter described. This button or manual control on the instrument board is operatively connected with the lever 163 (Figures 7, 16 and 17) affixed to shaft 164 upon which is mounted the pinion 165 engageable with the rack 166 carrying the said valve pin 162. The spring 167 serves to take up the backlash between gear members 165 and 166.

In the operation of the primary mixing chamber of unit 117, preheated air enters auxiliary air channel 119, as aforesaid, and is directed downwardly through the auxiliary venturis 125 and 126, thereby causing a depression in the throats of these venturis, under the direct influence of the vacuum in the intake manifold, and in this manner drawing up the hydrocarbon fuel through the fuel line 136, into the chambers 138 and 139, and through the jets 140 and 141. Inasmuch as the valve member 159 is normally unobstructed and open, the preheated air coursing through the channel 119 also enters through passageway 161 and valve member 159 into the transverse air channel 158, to be drawn down through the emulsion air ducts 146 and through the valves 149,—thereafter to be directed through channels 135 into the annular chambers 134 of the venturis 125 and 126, out through the apertures 133, and down said venturis to mix with the air flowing downward through the throats of the venturis. It will thus be noted that under these conditions, instead of hydracarbon in the usual liquid form being introduced into the mixture stream, an emulsion of heated air and the fuel is introduced into the venturis. My invention for providing idling and starting mixture enhances atomization and because there is no fuel by-passed through small orifices around the thottle as is done in conventional carburetors, freezing up of the throttles in certain atmospheric conditions is prevented. When the throttles are wide open and intake manifold vacuum drops to a low value, fuel stops emitting from the auxiliary venturis 125 and 126 and the emulsified hot air as well as the hot air passing through the throat of the said venturis keeps these units at a high degree of temperature. When the throttle is closed from wide open position, and the intake manifold vacuum rises to a higher value, the said venturis begin to discharge fuel, and being heated as above described, immediate atomization and gasification of the fuel ensues, thus preventing the formation of ice on the periphery of the throttle valves 175 (Figure 3) and causing them to freeze against the throttle bore which commonly occurs in conventional carburetors at this cycle of operation. The said venturis 125 and 126 having their discharge portions 130 pointing downwardly and ahead or anterior to the throttles 175 in the combustion mixture conduits 48 and 49 are thus fed with a combustible mixture, not having to pass the periphery of the said throttle valves 175,—in this way eliminating the hazard of freezing or forming ice coating on the periphery of the said throttle plates.

In controlling the idling fuel discharge on an anterior throttle type carburetor, it is desirable to air-bleed the fuel discharge jet to eliminate sensitiveness of adjustment and the necessity for extremely small diameter orifices. By referring to the Figures 18–20 it will be found that my invention eliminates the objections with a conventional carburetor. The said jets referred to are designated by the reference numerals 140 and 141, and the air bleed system by the reference numerals 148 and 149. With the construction above-described, the bleeding of the air through channels 135 when the valve 159 is open will obviously decrease the suction pull at the throats of the jets 140 and 141, thereby obviating the possibility of a flooding of the intake manifold. And obviously by proper adjustment of the valves 149 and 159, the pull on the fuel flowing through the said jets can be controlled as desired.

During the starting of the motor, the mixture control button 168 on the instrument panel (Figure 7) may be pulled out, thereby pulling the link 179 in the direction of the arrow to rotatably actuate the lever 163 to bring the needle valve pin 162 from its open position of Figure 19 towards its closed position. When this occurs, the amount of emulsifying air being admitted for admixture with the liquid fuel is accordingly decreased, thereby proportionately increasing the amount of liquid fuel introduced into the venturis 125 and 126. This however does not affect the amount of air being introduced from the hot air channel 119 through the outlets 123 and 124 into the auxiliary venturis 125 and 126,—the only air that is cut off being the so-called emulsifying air above-referred to. This is hence distinctively different from the conventional choke control whereby the air is practically shut off to cause over-rich conditions.

The arrangement is such that when the mixture control button 168 on the instrument panel is fully pulled out, the pin 162 will completely close the valve 159, and at the same time the circuit through the heating element 121 and the battery will be closed. This is effectuated by the engagement of the lug with the lever 181 of the switch 182 in the circuit. This obviously causes a further heating of the air coursing through channel 119 and entering the said primary venturis. Hence, when it is desired to start a cold engine under adverse conditions, the said button 168 is pulled out to its fullest extent, thereby enabling undiluted and unemulsified liquid fuel to be introduced into the Venturi system, together with extremely preheated air. The amount of preheated air required to produce this result is relatively small, and hence the amount of electrical energy consumed over the short period of time the circuit is closed is not excessive.

It has been found that inasmuch as the venturis 125 and 126 are subjected to the direct influence of the intake manifold depressions and not to depressions that are prevalent in carburetors (as with some conventional designs), there is sufficient suction through the auxiliary jets 140 and 141 to enable a considerable hydrostatic fuel-lift to be effectuated thus dispensing with need for auxiliary means of supplying fuel to the auxiliary Venturi system through fuel line 136. When, however, particularly during the starting or idling operation of the engine the depression in the intake manifold should decrease, a pulling out of the mixture control button 168 will cause, as aforesaid, a shutting off of the emulsifying air and consequently produce an increased suction on the fuel flowing through the jets 140 and 141, thereby making it possible at all times, under the most adverse conditions, to effect a sufficient hydrostatic fuel-lift for practical purposes through the auxiliary venturis. It should however be noted that the fuel lift arrangement in the throttle body unit 117 is primarily used for starting a motor. Provision is made for enriching the mixture for this purpose and for warming up the engine as aforesaid. Should need arise in operation of the engine to increase the hydrostatic fuel-lift, suction on the fuel feed line 136 is proportionately increased by pulling out the button 168 on the instrument panel (Figure 7) which actuates the metering needle 162 (Figure 19) closing off the aperture in seat 159, thus causing a restriction in the air flow from atmosphere through passage 161 thence through passage 158, communicating with emulsifying duct 146. The degree of the suction effectuated is determined by the position of the valve 162 in the valve seat 159, thus effectuating a hydrostatic rise in the fuel column passing through fuel line 136, thence through passage 137, auxiliary jets 140 and 141 and venturis 125 and 126. The auxiliary venturis 125 and 126 further serve as the idling discharge nozzles and continue discharging hydrocarbon fuel in the intake mixture throughout a partial throttle range. The degree and period of this discharge is determined by the intake manifold depression and the differential in the size of the orifices in the auxiliary fuel jets 140 and 141, and the apertures presented in the annulars between the metering needles 148 and the needle seats 149 (Figure 20). The fuel from line 187 for the multiple venturis constituting the main gasifying system would at all times be supplied by the arrangement of jets, metering and Venturi nozzles associated with block 105 at the inlet to the multiple Venturi system, hereinafter again referred to. The system can be so designed, in accordance with my invention, that below a certain predetermined intake manifold depression, the auxiliary fuel supply from line 136 will be cut off, and fuel supplied only through the main gasifying system from line 187; and it has been noted that in actual practice the pull on the main fuel line 187 remains practically constant after certain speeds are reached, regardless of subsequent increase in intake manifold depressions.

On conventional dual carburetors, difficulty has been experienced in synchronizing the respective idling adjustments. My invention provides a means for keeping the said idling adjustments in synchronism by the medium of gears 150 which are meshed with pinion gear 151. The adjusting knob 153 engages pinion gear 151 through shaft 154, coupling 152 and pin 156, (Figure 3). When knob 153 is rotated gears 150 move in unison, thus synchronizing the adjustment of the needle valves 148 in valve seats 149, thereby effecting the depression or suction in passages 135 and auxiliary fuel jets 140 and 141.

For initial idling setting, each adjustment can be set separately. This is accomplished by removal of the hexagon nut 200, air cleaner cover 30, backing out lock-screw 275 lifting pinion gear 151 upward out of mesh or engagement with gears 150. This allows a rotative movement of each threaded stem 147 and needle valves 146 for separate idling setting for each throttle valve 175. When this setting is made, pinion gear 151 is meshed in engagement with the respective gears 150 and lock-screw 275 is screwed on, thus keeping the said pinion 151 meshed in engagement with the said gears 150. Thereafter, any rotative movement of pinion gear 151 will move gears 150 in unison. This is an important feature of my invention as the idling adjustments therefor venturis 125 and 126 can be set on a flow-bench or a motor at the time of the manufacture of the carburetor or gasifier and synchronized as above described, thus assuring identical idling settings when the device is attached to the motor on which it is to be used. It is especially beneficial in motors of the V-type wherein one carburetor throttle controls the flow of combustible intake mixture to some cylinders on one bank and to other cylinders on the opposite bank of the engine, as is the case with the Ford V-8 engine referred to in this specification. By synchronization of the flow of combustible intake mixture through the anterior throttle discharge Venturi nozzles 125 and 126 referred to above, a more uniform ratio of fuel to air is obtained not only in the idle adjustment setting but part throttle operation as well. This results in smoother running of the engine.

To insure quick warming up of the throttle body unit 117 (Figure 17) and for smooth running in normal operation of the engine, an exhaust jacket or heat bridge 169 surrounds the lower portion of the said throttle body unit 117. This so-called jacket or heat bridge contains a passageway 170 (see Figures 3, 4, 6 and 20) connecting through the ports 171 and 172 in the wall 47 in the intake manifold,—these ports communicating directly with the ports 173 and 174 of the exhaust ports cast integral with the cylinder block communicating with the exhaust valves on certain of the cylinders of the engine. Said exhaust ports form a branch of the respective exhaust manifolds attached to the outer wall of the cylinder block on both the right hand and the left hand side of the engine. The arrangement is such as to cause a portion of the burnt or exhaust gases to be directed through the said ports 173 and 174, into ports 171 and 172 and through the passageway 170, to produce alternating surges of such burnt or exhaust gas currents. In this way the region surrounding the auxiliary venturis 125 and 126 will be preheated during the operation of the motor. The dissipation of heat through the walls of the said throttle body unit 117, (Figures 4 and 5), entering the combustible intake mixture, assists the atomization and the gasification of the fuel and is conducive to smoother running especially at idling and part throttle operation. It is, however, to be understood that this exhaust heat jacket or heat bridge so called, can be dispensed with by merely plugging up the ports 171 and 172 or by providing valves for either manually or automatically controlling the flow of exhaust gases through said ports 173 and 174.

The casing 117 also is adapted to contain therein the anterior throttle valves 175 and 176, these being positioned between the discharge ends of the multiple Venturi gasifier and the intake manifold. These throttles are mounted off-center on shaft 177 extending through the body of the casing, the shaft being operatively connected to the accelerator pedal in a manner to be hereinafter described.

The throttle valves 175 and 176 are normally maintained in a closed position by the spring 183 operatively associated with the accelerator pedal 184 and the accelerator link 185 connected in known manner, through suitable linkage 186 extending through the intake manifold casing, to the rod 214 joined to the throttle valve lever 215 (Figures 21 and 22). Affixed to the throttle valve shaft 177 is the disc 216 containing thereon the lug 217; and rotatably mounted over shaft 177 is the terminal end 218 of the lever 215 containing thereon a stop 219 abuttable with lug 217.

Normally, as aforesaid, the throttle valves are in their closed positions under the influence of spring 183. When the engine suction causes an opening of the unbalanced throttle valves 175 and 176, due to the pressure differential on opposite sides thereof, the disc will rotate in a clockwise direction (Figure 22) until the lug 217 encounters the stop 219, beyond which the valves cannot be opened. The position of the stop 219 is obviously controlled by the position of the accelerator pedal 184, a depressing thereof resulting in a movement of the link 185 and rod 214 in the direction of the arrows (Figure 21) to cause a rotation of the lever 215 in a clockwise direction,—or in a direction away from the normal position of the stop 217. Hence when the pedal is pressed down for more gas, all that is done is to draw the stop 219 away from the lug 217, thereby permitting the throttle valves to open by the engine suction to a point controlled by the action of the accelerator pedal.

There is thus no direct opening effort exerted by the pedal. But the operator has, nevertheless, complete control for the closing of the valves, inasmuch as a release of the pedal 184 under the influence of spring 183 will cause a counterclockwise movement of the lever 215, thereby forcing the lug 217 (with which it is in engagement) to move with it to produce a closing rotation of the throttle valves.

In this manner the opening of the throttle valves is taken out of the manual control of the operator, the valves being opened, through the depression in the intake manifold system, entirely by the suction of the motor. This automatic control of the offset axis throttle valves prevents the sudden drop in depressions in the intake manifolds, thus assisting the carbureting system to charge each respective cylinder with the proper amount of combustible mixture, thus tending to eliminate detonation or pinging.

In order to dampen out all fluttering of the sensitive anterior throttle valves 175 and 176 due to engine pulsations, I employ the liquid dash pot device 178. Attached to the shaft 177 is the arm 220, and pivotally detached to the outer end thereof is the link 221. Pivotally attached at 222 of the link is the piston 223 containing therein a hollow chamber 224 open at the bottom and provided therein with the disc-like valve 225. The upper peripheral edge 226 of this valve is bevelled for engagement with the correspondingly bevelled upper portion 227 of the interior of chamber 224. The valve 225 contains the peripheral vertical slots 228a intersecting the bevelled annular peripheral edge 226; and the piston is provided with a plurality of radially extending channels 228 communicating between the upper portion of the piston and the wall 230 of the cylinder 231. And positioned within a suitable annular groove in the lower portion of the wall of the piston chamber 224 is the lock ring 232 forming a lower seat for the valve 225.

The cylinder 231 is filled with any suitable fluid, such as alcohol, oil or mercury, preferably up to level 233 above the level of the channels 228. Upon an opening movement of the valves 175 and 176 the piston rod and piston will be urged downwardly. This causes the valve 225 to be elevated by the fluid pressure until the bevelled edge 226 thereof is seated against the wall 227 to completely shut off channels 228 from communication through the interior of the piston with the interior of the cylinder,—the upward movement of valve forcing out any air that might be trapped in the upper part of chamber 224. Upon the continued downward movement of the piston, the fluid from the cylinder will be forced upwardly through the relatively small space between the wall 230 and the body of the piston,—and then through space 229 to overlie and submerge the top 235 of the piston; the cylindrical wall 230 keeping the fluid confined within the vessel. It is thus seen that an opening effort upon the throttle valves is resisted by the action of the fluid, although an operative movement is permitted due to the upward movement of the cylindrical column of liquid.

When a closing movement is imparted to the throttle valves 175 and 176, the arm 220, the link 221 and the piston will be elevated. When this occurs, the valve 225 will be forced down onto the lock ring 232, and the fluid will flow down into the cylinder 231 through the channels 228 and slotted portions 228a, as well as through the spaces 229 and 234. Thus there will be less resistance to an upward movement of the valve 225 than to a downward movement; thereby enabling the throttle valves 175 and 176 to be more easily closed than opened,—and yet at all times producing a dampening effect on the opening movement of these valves.

The main air valve 99 at the entrance to the main gasifying system is also normally yieldably kept closed, and operable under the influence of the engine suction. I prefer to employ in association with valve 99 an air dash pot device 205 controlled by the depression prevailing in the mixing chamber or Venturi conduit system,—a description of this device to be hereinafter given.

The fuel inlet means provided at the entrance to the main mixing chamber is associated with the metering block 195, and is fed by a main fuel line 187, as aforesaid. This communicates through channel 108 with the two passageways 189, which in turn communicate with the two main inlet Venturi nozzles 103 through the channels 190. Positioned within said passageways are the metering pins 191 which control the amount of fuel drawn into the Venturi nozzles through the medium of the needle valve terminals 192 and the valve seats 193. The said metering pins are secured to and suspended from the lift blocks 194, which contain overhanging flanges 195 overlying the lifting lever 197 fixedly mounted upon metering shaft 196. The metering pins are threaded into the said lift blocks so that they can be properly adjustably positioned within the passageways 189, and once set, they will be held against displacement by the lock nuts 206. The metering pin springs 207, preferably held in proper position by the bosses 208 and upper terminals of the metering pins, are illustrated as being in abutment with said lock nuts to normally urge the metering pins into their lowermost positions, whereby predetermined minimum amounts of fuel will be delivered to the nozzles 103, in accordance with the specific design and operating requirements.

Also fixedly attached to said shaft 196 is the roller lever arm 209, the outer terminal end of which contains the roller 210 normally kept in engagement, under the influence of springs 207, with the cam 211 fixedly secured to the shaft 212 of the air valve 99. The air valve is connected through lever 213, also mounted on shaft 212, to the dash pot 205, which normally keeps the air valve in its closed position, as will more clearly hereinafter appear.

In the operation of the above-described metering device, it is apparent that the amount of liquid fuel drawn into the main multiple-Venturi system through nozzles 103 is dependent upon the position of the air valve 99, inasmuch as an opening movement (counter-clockwise in Figure 29) of the valve will cause a corresponding rotation of the cam 211, roller arm 209 and lift lever 195. And upon an upward movement of lever 197, the lift blocks 194 and the metering pins 191 will be correspondingly lifted, against the action of springs 207, to admit more fuel through the channels 190 into the nozzles 103. The valve 99 being, as aforesaid, mounted off-center, it will be opened, against the action of the dash pot device 205, by the engine suction. Hence the arrangement is such as to provide for an automatic control of the main liquid fuel supply in accordance with engine demands, the amount of liquid fuel admitted being in that proportion to the air admitted through valve 99 as is determined by the design and contour of the cam 211, and the construction of the dash pot device 205, which will now be determined.

For best and most efficient results it is desirable that there be provided greater resistance to the operative opening effort exerted upon the air valve 99 at low speeds than at high speeds, and that this resistance be decreased as the engine develops great power and speed so that proportionately more air will be admitted to the mixing chamber. This is effectuated by the dash pot device 205 which contains the cylinder 240 and the piston 241 connected by link 242 to arm 213 affixed to the air valve shaft 212. The spring 243 within the cylinder normally urges the piston upwardly and the air valve 99 into its closed position. Extending from the bottom of the cylinder 240 is the tube 244 which communicates with the interior of the casing 95 housing the main venturis which receive and conduct the air and fuel mixture. Thus the depression within housing 95 caused by the engine suction is communicated through tube 244 to the interior of dash pot cylinder 240 to pull the piston 241 down and consequently help to open valve 99 against the action of spring 243. Hence at low speeds, when the depression within casing 95 is low, owing to the free flow of air through the secondary venturis 103, the engine suction will have relatively little effect on piston 241, so that under these conditions comparatively little air will be admitted through valve 99. But as the power and speed of the engine increases, the throats in venturis 103 become inadequate to supply the increased demand for air, hence the depression within the housing 95 will be correspondingly increased, causing a greater opening of the valve 99 for the admission of more air into the mixing chamber.

Cooperatively associated with dash pot 205 is the fluid dash pot device 250 connected through link 251 and arm 252 to the air valve shaft 212. The arm 252 is affixed to shaft 212 and together with arm 213 forms a beam member adapted to reciprocatingly actuate the pistons 241 and 253 in opposite directions. Although the cylinders 240 and 254 are illustrated as being separate units, it is of course understood that they can be combined in a single unitary structure. The said piston 253 contains a vertical passageway 255 therein extending to the bottom surface thereof, the passageway containing a ball check valve 256 for permitting an upward flow of fluid through the passageway, and preventing a downward flow therethrough in well known manner.

Normally when the air valve 99 is closed, the piston 241 is in its uppermost and the piston 253 in its lowermost position,—the cylinder 254 containing therein a selected liquid. When the valve 99 is operatively opened and the piston 241 lowered, the piston 253 will be caused to rise against atmospheric air pressure, creating a vacuum underneath the piston and gradually drawing down the fluid along the peripheral space 258. This action obviously has a retarding influence upon the opening of valve 99, thereby not only preventing a fluttering of the valve, but also serving to maintain a sustained pull on the main fuel nozzles, as will more clearly hereinafter appear. During the upward movement of piston 253, the check 256 will obviously close the passageway 255, whereas during the down stroke of piston 253 the ball check will move out of its obstructing position to permit the upward flow of the fluid through the passageway. Thus dash pot 250 also serves to provide greater resistance to the opening of the air valve then to its closing, and is a valuable adjunct to dash pot 205 whose effectiveness in restraining the opening of valve 99 decreases with engine suction which is communicated to cylinder 240 through tube 244, as aforesaid.

The action above described is of considerable importance in fuel lift devices, particularly of the type employed in the engine construction forming the subject matter of this invention where accelerator pumps are neither employed nor considered desirable. If the retarded action of the air valve 99 were not to take place, an opening of the main throttle valves would cause a decrease in the depression in the main Venturi mixing chamber, with a consequent decrease in the suction pull exerted on the main fuel supply nozzles,—a condition which would be aggravated by the production of a lean mixture caused by the inrush of the air through inlet 99. But with the retarding influence upon air valve 99 by the mechanism above described, sufficient depression is maintained in the mixing chamber during acceleration to uninterruptedly draw the fuel from the main fuel nozzles.

It is thus apparent that by the structure and method of my invention as hereinabove described, the air required for combustion within the cylinders of the engine is so treated, heated, apportioned, distributed and conveyed as to enable it to perform manifold functions. The air is drawn in from the atmosphere through an air cleaner of novel design whereby the air is cleansed by a device devoid of the disadvantages inherent in conventional structures, as hereinabove set forth. The distribution of the air initially drawn in is so effected as to be conducive to the maintenance of substantially uniform and relatively cool temperatures throughout the extent of the intake manifold, for uniform conditions and high volumetric efficiencies. A portion of the cleansed air is immediately directed into the gasifying system for thorough interpenetration with the vaporized fuel stream, and another portion of the air is diverted through the cylinder heads of the engine and the exhaust manifolds to absorb the heat therefrom, whereby such sensible heat as is absorbed is subsequently employed for gasification, fuel-lift purposes, to enhance the thermal efficiency of the engine, as well as to effectuate a quick starting thereof under adverse conditions. The arrangement is such as to enable a wide range of fuels, from heavy solvents to light hydrocarbons, to be effectively gasified,—a result hardly possible with any known system of carburetion. And by maintaining an effective and substantially unobstructed circulation of relatively cool air over the intake manifold and main gasifying system, the likelihood of "vapor-lock" is practically eliminated regardless of atmospheric conditions. And it is to be further observed that by employing some of the preheated air for producing an emulsified charge of fuel admixed with the preheated charge of air directed through the primary starting and idling venturis, the richness of the fuel mixture for such purposes can be readily controlled without restricting the air charge, as is necessary with conventional "choke" controls; and also by such means is the danger from the formation of ice on carburetor parts entirely obviated.

Although my invention as above described is illustrated in the drawings as being specifically applied to a Ford V-8 engine, it is of course understood that it is equally adaptable for use with other types of internal combustion engines. It is also understood that other additional forms and modifications of the apparatus and adaptations of the method constituting this invention can be employed beyond and in addition to those hereinabove described, all within the scope of the appended claims.

What I claim is:

1. In an internal combustion engine having a longitudinally extending bank of cylinders, a cylinder head unit containing a plurality of laterally enclosed air passageways extending above the combustion chambers of the engine and transversely with respect to said longitudinal bank of cylinders, and heat radiating ribs extending into said passageways from the walls thereof adjacent the respective combustion chambers.

2. In an internal combustion engine, a cylinder head unit containing a laterally enclosed air passageway extending above and transversely across the combustion chamber of the engine, the intermediate portion of said passageway being of relatively large proportions to provide a low velocity zone for the air coursing therethrough.

3. In an internal combustion engine, a cylinder head unit adapted for operative use with a multi-cylindered engine, containing an air inlet, an air outlet, and a plurality of laterally enclosed air passageways each extending above and transversely across the combustion chamber of one cylinder of the engine and communicating between said inlet and outlet.

4. In an internal combustion engine, a cylinder head unit according to claim 3, further provided with ducts extending longitudinally of the unit and communicating between said transverse passageways and said air inlet and air outlet respectively.

5. In an internal combustion engine, a cylinder head unit adapted for operating use with a multicylindered engine containing a plurality of laterally enclosed air passageways extending above and transversely across the combustion chambers of the engine, and laterally enclosed water passageways adjacent said air passageways and having portions thereof disposed above said combustion chambers.

6. In an internal combustion engine, a cylinder head unit adapted for operating use with a multicylindered engine, containing a plurality of laterally enclosed air passageways extending above and transversely across the combustion chambers of the engine, and oppositely disposed air inlet and outlet means communicating with said air passageways and positioned substantially along the medial portions of said unit.

7. In an internal combustion engine, a cylinder head unit adapted for operating use with a multicylindered engine, containing a plurality of laterally enclosed air passageways extending above and transversely across the combustion chambers of the engine, heat radiating ribs within said passageways and disposed substantially longitudinally thereof to provide longitudinal paths for the air flowing therethrough, the intermediate portions of each of said passageways being of expanded proportions to provide low velocity zones for said air.

8. In an internal combustion engine, a cylinder head unit adapted for operating use with a multicylindered engine, containing a plurality of laterally enclosed air passageways extending above and transversely across the combustion chambers of the engine, heat radiating ribs within said passageways and disposed substantially longitudinally thereof to provide longitudinal paths for the air flowing therethrough, the intermediate portions of each of said passageways being of expanded proportions to provide low velocity zones for said air, laterally enclosed water passageways adjacent said air passageways and having portions thereof disposed above said combustion chambers, oppositely disposed air inlet and outlet means positioned substantially along the medial portions of said unit, and ducts extending longitudinally along said unit and disposed between said air passageways and said inlet and outlet means respectively

OTIS C. FUNDERBURK.